United States Patent
Ulmer

(10) Patent No.: US 10,481,273 B1
(45) Date of Patent: Nov. 19, 2019

(54) SYSTEMS AND METHODS FOR GNSS PROCESSING DURING INTERFERENCE SUPPRESSION

(71) Applicant: Rockwell Collins, Inc., Cedar Rapids, IA (US)

(72) Inventor: Karl W. Ulmer, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 218 days.

(21) Appl. No.: 15/804,996

(22) Filed: Nov. 6, 2017

(51) Int. Cl.
*G01S 19/21* (2010.01)
*H04B 1/711* (2011.01)
*H04B 1/71* (2011.01)

(52) U.S. Cl.
CPC .............. *G01S 19/21* (2013.01); *H04B 1/711* (2013.01); *H04B 1/71* (2013.01); *H04B 2201/709718* (2013.01)

(58) Field of Classification Search
CPC ......... G01S 19/21; H04B 1/71; H04B 1/7103; H04B 1/711; H04B 2201/709718
USPC .................................................... 342/357.59
See application file for complete search history.

(56) References Cited

U.S. PATENT DOCUMENTS

| 5,822,429 A * | 10/1998 | Casabona | G01S 19/015 |
| | | | 380/252 |
| 6,639,541 B1 * | 10/2003 | Quintana | G01S 19/21 |
| | | | 342/18 |
| 2007/0097271 A1 * | 5/2007 | Gao | H04B 1/123 |
| | | | 348/724 |
| 2008/0303714 A1 * | 12/2008 | Ezal | G01C 21/005 |
| | | | 342/357.22 |
| 2011/0171920 A1 * | 7/2011 | Kim | H04B 1/525 |
| | | | 455/257 |

* cited by examiner

*Primary Examiner* — Dao L Phan
(74) *Attorney, Agent, or Firm* — Donna P. Suchy; Daniel M. Barbieri

(57) ABSTRACT

A receiver device includes a radio frequency receiver and a processing circuit. The radio frequency receiver receives an incoming signal including a radio frequency satellite signal. The processing circuit is configured to generate a calibration signal, apply the calibration signal to the incoming signal to generate a calibrated incoming signal, execute an interference suppression algorithm on the calibrated incoming signal to generate a suppressed calibrated incoming signal, execute a tracking channel using the suppressed calibrated incoming signal to generate a suppressed calibrated pseudorange parameter, compare the suppressed calibrated pseudorange parameter to a predetermined calibrated pseudorange parameter to determine an interference suppression error, execute the interference suppression algorithm on the incoming signal to generate a suppressed incoming signal, execute a tracking channel using the suppressed incoming signal to generate a satellite pseudorange parameter, modify the satellite pseudorange parameter using the interference suppression error, and output a location of the receiver device.

20 Claims, 5 Drawing Sheets

SYSTEMS AND METHODS FOR GNSS PROCESSING DURING INTERFERENCE SUPPRESSION

BACKGROUND

The inventive concepts disclosed herein relate generally to the field of navigation systems. More particularly, embodiments of the inventive concepts disclosed herein relate to systems and methods for GNSS processing during interference suppression.

In existing satellite receivers, such as for acquiring and tracking signals from a global positioning system (GPS) and/or global navigation satellite system (GNSS) satellite vehicle, interference suppression systems, also known as anti jamming systems, may be used. Interference suppression systems may be used to counteract radio frequency signal interference, which may be present due to other entities directing jamming or spoofing signals towards the satellite receiver. While interference suppression systems can help the satellite receivers make GNSS calculations when radio frequency signal interference is present, the interference suppression systems can also introduce error into the GNSS measurements used for navigation calculations. For GNSS applications, which depend on very accurate timing information to properly track the satellite signals, even a very small timing error in the GNSS calculation can result in a significant position error. For example, when calculating a time delay shift to correlate a local GNSS code to a GNSS signal code from a satellite vehicle, a timing error of just 10 nanoseconds can result in a position error of 3 meters, which can be a significant error for many applications, including but not limited to precision position determination, navigation, and/or targeting applications which may require accuracy on the order of centimeters.

SUMMARY

In one aspect, the inventive concepts disclosed herein are directed to a receiver device. The receiver device includes a radio frequency receiver and a processing circuit. The radio frequency receiver is configured to receive an incoming signal, the incoming signal including a radio frequency (RF) satellite signal from a satellite vehicle. The processing circuit is configured to generate a calibration signal, apply the calibration signal to the incoming signal to generate a calibrated incoming signal, execute an interference suppression algorithm on the calibrated incoming signal to generate a suppressed calibrated incoming signal, execute a first tracking channel using the suppressed calibrated incoming signal to generate a suppressed calibrated pseudorange parameter, compare the suppressed calibrated pseudorange parameter to a predetermined calibrated pseudorange parameter to determine an interference suppression error, execute the interference suppression algorithm on the incoming signal to generate a suppressed incoming signal, execute a second tracking channel corresponding to the satellite vehicle using the suppressed incoming signal to generate a satellite pseudorange parameter, modify the satellite pseudorange parameter using the interference suppression error, and output a location of the receiver device based on the modified satellite pseudorange parameter.

In a further aspect, the inventive concepts disclosed herein are directed to a method. The method includes receiving an incoming signal, the incoming signal including a radio frequency (RF) satellite signal from a satellite vehicle, generating a calibration signal, applying the calibration signal to the incoming signal to generate a calibrated incoming signal, executing an interference suppression algorithm on the calibrated incoming signal to generate a suppressed calibrated incoming signal, executing a first tracking channel using the suppressed calibrated incoming signal to generate a suppressed calibrated pseudorange parameter, comparing the suppressed calibrated pseudorange parameter to a predetermined calibrated pseudorange parameter to determine an interference suppression error, executing the interference suppression algorithm on the incoming to generate a suppressed incoming signal, executing a second tracking channel corresponding to the satellite vehicle using the suppressed incoming signal to generate a satellite pseudorange parameter, modifying the satellite pseudorange parameter using the interference suppression error, and outputting a location of the receiver device based on the modified satellite pseudorange parameter.

In a further aspect, the inventive concepts disclosed herein are directed to an airborne platform. The airborne platform includes a satellite receiver associated with an antenna configured to receive an incoming signal, the incoming signal include a radio frequency (RF) satellite signal from a satellite vehicle. The satellite receiver includes a processing circuit configured to generate a calibration signal, apply the calibration signal to the incoming signal to generate a calibrated incoming signal, execute an interference suppression algorithm on the calibrated incoming signal to generate a suppressed calibrated incoming signal, execute a first tracking channel using the suppressed calibrated incoming signal to generate a suppressed calibrated pseudorange parameter, compare the suppressed calibrated pseudorange parameter to a predetermined calibrated pseudorange parameter to determine an interference suppression error, execute the interference suppression algorithm on the incoming signal to generate a suppressed incoming signal, execute a second tracking channel corresponding to the satellite vehicle using the suppressed incoming signal to generate a satellite pseudorange parameter, modify the satellite pseudorange parameter using the interference suppression error, output a location of the receiver device based on the modified satellite pseudorange parameter.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
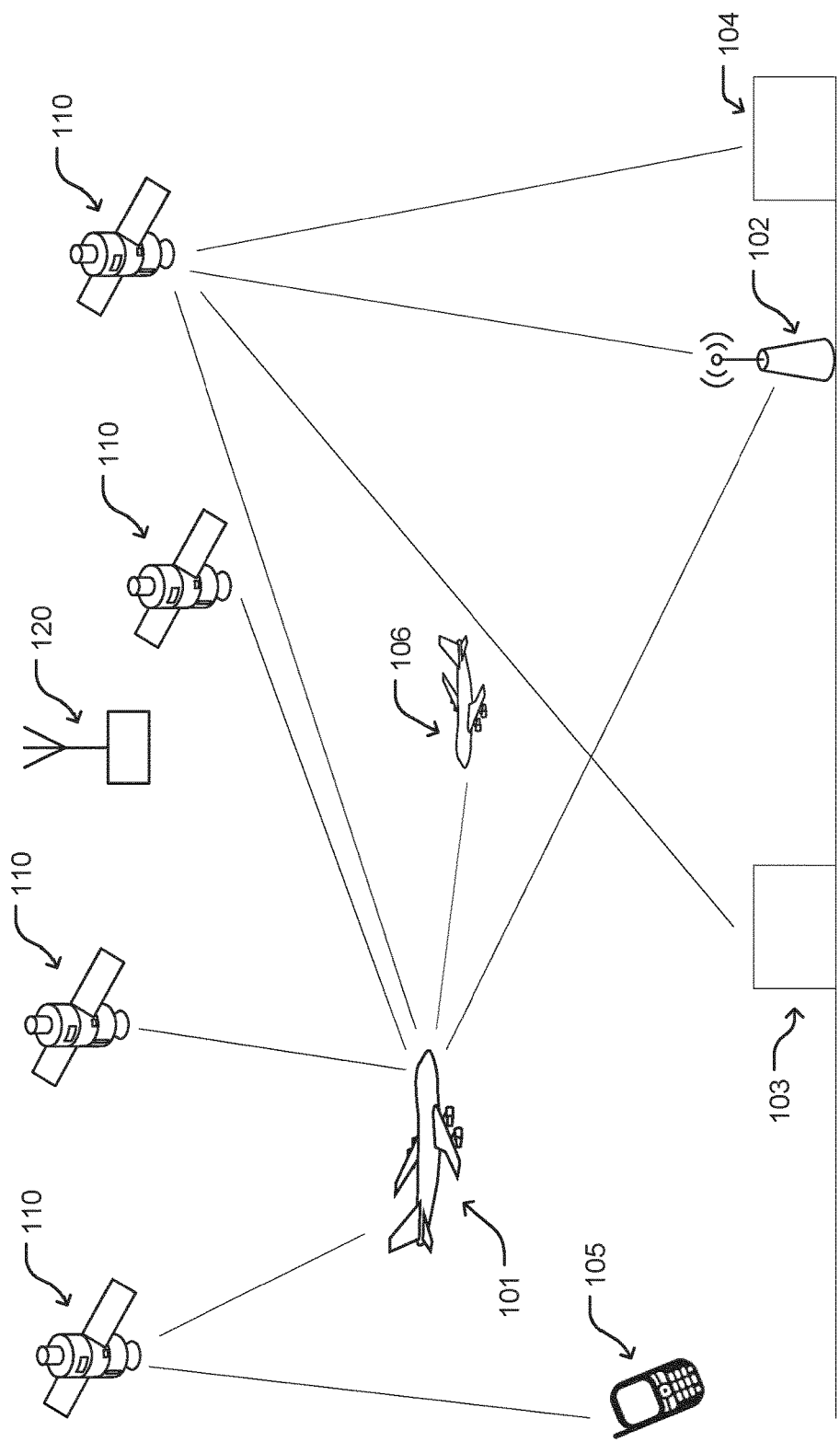
FIG. 1 is a schematic diagram of an exemplary embodiment of a communication network for communication with GNSS satellite vehicles according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for real-time GNSS processing during interference suppression. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the inventive concepts disclosed herein are described in connection with systems and methods implementable for a platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system, a portable electronic device, a hand-held location tracking device). The systems and methods described herein may be implemented for GPS/GNSS communications and calculations, or other signal processing devices which rely on interference suppression/anti-jamming technologies to overcome radio frequency interference (but which may be subject to processing errors due to the interference suppression).

In some embodiments, a receiver device includes a radio frequency receiver and a processing circuit. The radio frequency receiver is configured to receive an incoming signal, the incoming signal including a radio frequency (RF) satellite signal from a satellite vehicle. The processing circuit is configured to generate a calibration signal, apply the calibration signal to the incoming signal to generate a calibrated incoming signal, execute an interference suppression algorithm on the calibrated incoming signal to generate a suppressed calibrated incoming signal, execute a first tracking channel using the suppressed calibrated incoming signal to generate a suppressed calibrated pseudorange parameter, compare the suppressed calibrated pseudorange parameter to a predetermined calibrated pseudorange parameter to determine an interference suppression error, execute the interference suppression algorithm on the incoming signal to generate a suppressed incoming signal, execute a second tracking channel corresponding to the satellite vehicle using the suppressed incoming signal to generate a satellite pseudorange parameter, modify the satellite pseudorange parameter using the interference suppression error, and output a location of the receiver device based on the modified satellite pseudorange parameter.

The receiver device can be integrated with an airborne platform or other platform as described herein. For example, the systems and methods for GNSS processing during interference suppression described herein can be associated with avionics controllers or other critical electronic devices, such as those in an aircraft cockpit or control center, of the airborne platform. The receiver device can also be integrated with a portable electronic device.

Systems manufactured in accordance with the inventive concepts disclosed herein can improve the operation of GNSS receiver hardware (including GPS receiver electronics), as well as portable electronic devices or aircraft or other airborne platforms including GNSS receiver hardware, by increasing the accuracy of GNSS position determination, in real-time, even while interference suppression systems are used to modify incoming radio frequency signals. These improvements can allow for more accurate navigation and/or targeting applications, even where increased accuracy as compared to typical systems (e.g., accuracy to the centimeter scale) is desired. These improvements can also improve GNSS technologies by allowing for interference suppression systems to be used in more applications where the error introduced by interference suppression would otherwise limit their useability (even if the specific algorithms being used for interference suppression are unknown).

Referring now to FIG. 1, a communication network 100 is shown according to an exemplary embodiment of the inventive concepts disclosed herein. The communication network 100 includes various platforms including an airborne platform 101, a ground-based (e.g., stationary) platform 102, a mobile ground platform 103, a maritime platform 104, and/or a portable electronic device 105 (e.g., handheld device). It will be appreciated that various other communications devices may be included in the communication network 100 so as to communicate with the one or more satellite vehicles 110. The various platforms can be configured to transmit/receive (e.g., via one or more receiver/transmitter/transceiver hardware devices) radio frequency signals to/from various remote sources. The platforms can receive incoming signals (e.g., radio frequency signals such as GNSS/GPS signals) from one or more satellite vehicles 110 along various lines of sight. The platforms can receive signals from other platforms; for example, as shown in FIG. 1, the airborne platform 101 is configured to receive signals from remote sources, such as the ground-based platform 102 and from one or more remote airborne platforms 106. The lines of sight to the various remote sources may overlap. As the platforms (e.g., airborne platform 101) change in position and/or orientation relative to the remote sources, the platforms may lose or have to reset tracking of the signals. Radio frequency signals may be reflected by various platforms or the ground, complicating tracking of the remote sources. Similarly, in a multi-path environment (not shown), such as an urban environment for communication with portable electronic devices, each signal may be received by the platforms along two or more paths. Various such issues may increase the complexity of acquiring and tracking signal sources, such as satellite vehicles 110, and thus the errors associated with determining location using the signals.

The communication network 100 also includes one or more radio frequency interference devices 120. The radio frequency interference devices 120 can output radio frequency signals which interfere with typical transmission and reception of GNSS signals from satellite vehicles 110. The radio frequency interference devices 120 may be configured to jam reception of GNSS signals from satellite vehicles 110. For example, the radio frequency interference devices 120 may output radio frequency signals to cause matched spectrum, multiple narrow band, partial band, and or swept jamming interference. The radio frequency signals output by the radio frequency interference devices 120 can cause loss of signal tracking or degraded tracking resulting in GNSS calculations with less accuracy, debilitating the ability of various entities (e.g., platforms 101-104, portable electronic device 105) to successfully perform navigation and/or targeting operations.

Figure 2:
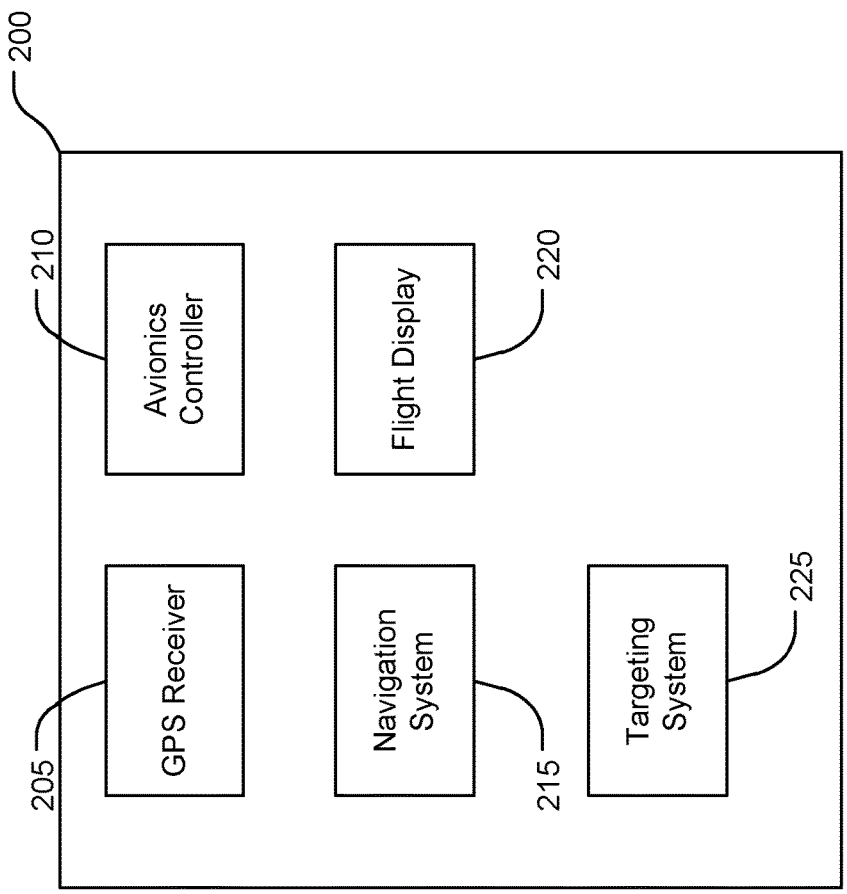
FIG. 2 is a block diagram of an exemplary embodiment of an avionics system implementing a GNSS receiver according to the inventive concepts disclosed herein.
Figure 2:
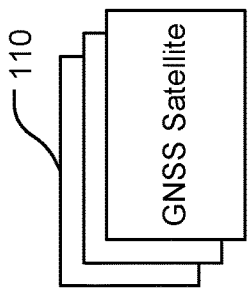

Referring now to FIG. 2, a block diagram of a system 200 is shown according to an exemplary embodiment of the inventive concepts disclosed herein. The system 200 can be implemented on the airborne platform 101, and is configured to calculate a range to one or more satellite vehicles 110 (e.g., GNSS satellite vehicles), such as for determining the location of the system 200 or the airborne platform 101 or an electronic device associated with the system 200. The system 200 includes a GPS/GNSS receiver 205, an avionics controller 210, a navigation system 215, a flight display 220, and a targeting system 225. While FIG. 2 illustrates the system 200 as being implemented in an airborne platform, as noted above, the inventive concepts disclosed herein may be implemented in various platforms including ground-based platforms or portable electronic devices; for example, the avionics controller 210 in various embodiments may be configured as a controller specific to the platform implementing the system 200.

One or more components of the system 200 (e.g., GNSS receiver 205, avionics controller 210) may include a processing circuit. The processing circuit (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

In some embodiments, the GNSS receiver 205 is configured to receive incoming signals including radio frequency satellite signals from the one or more satellite vehicles 110. The GNSS receiver 205 can include an antenna configured to receive radio frequency signals. The GNSS receiver 205 can be configured to execute computational processes on the received radio frequency signals, including determining a location associated with the GNSS receiver 205 based on processing one or more received radio frequency signals. The GNSS receiver 205 can execute signal tracking channels which correlate the received radio frequency signals to predetermined code signals in order to calculate pseudorange values (e.g., code position measurements; carrier phase measurements) corresponding to each satellite vehicle 110. The GNSS receiver 205 can be configured to execute interference suppression algorithms intended to counteract radio frequency interference (e.g., jamming). The GNSS receiver 205 can be configured to generate and output position data regarding the determined location associated with the GNSS receiver 205 using the pseudorange values. The GNSS receiver 205 can execute various functions according to the inventive concepts disclosed herein (e.g., as described with reference to receiver device 300 of FIG. 3) to reduce errors associated with executing interference suppression algorithms.

The avionics controller 210 can be configured to control various components of the airborne platform 101, such as engine control functions, navigation functions, or flight control functions. The avionics controller 210 can be configured to receive the position data from the GNSS receiver 205 and cause the flight display 220 to display information based on the position data. As noted above, in various embodiments, the system 200 may include a controller specific to the airborne platform 101.

The navigation system 215 can use the position data (e.g., location associated with the GNSS receiver 205) to execute navigation functions. For example, the navigation system 215 can use the position data to display a location of system 200 (e.g., of an airborne platform 101 having the system 200), to update a flight plan, to calculate distances and ranges to remote locations or targets, or to calculate state data (e.g., speed, heading).

The position data generated in accordance with the inventive concepts disclosed herein can be implemented in various navigation functions. For example, as described herein, pseudorange calculated by the GNSS receiver 205 (and/or receiver device 300 described with reference to FIG. 3) can be provided to the navigation system 215. Pseudorange calculated by multiple receiver devices can be combined, such as in aviation implementations as well as GNSS/GPS surveying implementations. One or more of the multiple receiver devices may calculate pseudorange according to the inventive concepts disclosed herein. The multiple receiver devices may be spatially separated from one another and/or autonomously operated, so that the navigation system 215 combines position data from such multiple devices. The navigation system 215 can use the position data together with position and/or orientation data from various other sensors or navigational aids such as an inertial navigation system, a wheel sensor, or Doppler aiding.

The flight display 220 can include one or more displays. The flight display 220 can be provided in an aircraft cockpit or control center, such as for display to a pilot and/or co-pilot. The flight display 220 can be configured to display flight critical information. The flight display 220 can be configured to display information based on position data received from the GNSS receiver 205, such as to display a position of the airborne platform 101, as well as a flight plan map which may be displayed along with the position of the airborne platform 101.

The targeting system 225 can use the position data to calculate targeting parameters. For example, the targeting system 225 can use the position data to calculate a distance to a target, and accordingly calculate a desired targeting trajectory to the target. In various embodiments, the increase in accuracy and/or reduction in error of the position data provided by the inventive concepts disclosed herein can improve operation of the targeting system 225 by improving the accuracy and precision of targeting solutions.

Figure 3:
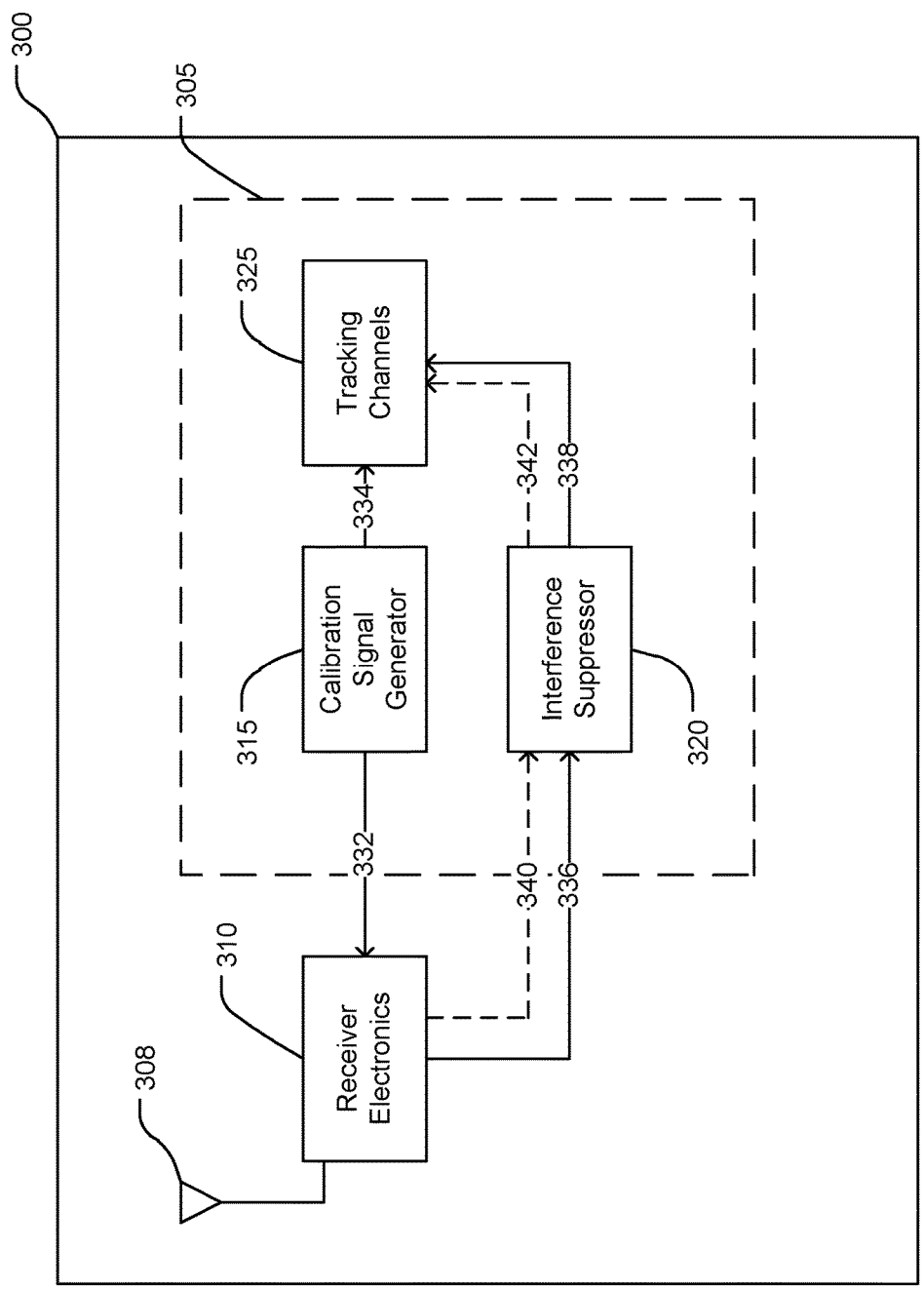
FIG. 3 is a block diagram of an exemplary embodiment of a receiver device according to the inventive concepts disclosed herein.

Referring now to FIG. 3, a block diagram of a receiver device 300 is shown according to an exemplary embodiment of the inventive concepts disclosed herein. The receiver device 300 can implement features of the system 200 described with reference to FIG. 2 (e.g., the GNSS receiver 205). The receiver device 300 includes a processing circuit 305 and receiver electronics 310. The processing circuit 305 can be implemented using various electronic components similar to those described with reference to FIG. 2. In some embodiments, the processing circuit 305 or components thereof are implemented using an application specific integrated circuit. The processing circuit 305 and components thereof can execute the functions described herein (e.g., while receiving satellite signals from satellite vehicles 110; while under the influence of radio frequency interference, such as from remote jamming devices).

The receiver electronics 310 can receive and process radio frequency signals. The receiver electronics 310 can include or be coupled to a radio frequency antenna 308 which receives incoming radio frequency signals. The radio frequency antenna 308 can receive incoming radio frequency signals which include satellite vehicle signals from one or more satellite vehicles 110. For example, the incoming radio frequency signals can include signals transmitted from a plurality of the satellite vehicles 110 as illustrated in FIG. 1.

Due to the multiple satellite vehicle signals and other complicating factors described above, the incoming radio frequency signals may be relatively noisy or may be subject to adverse interference, making it difficult for a location to be calculated with sufficient accuracy using the incoming radio frequency signals. The radio frequency antenna 308 can generate radio frequency data (e.g., an electrical or optical signal encoding the radio frequency data) based on the incoming radio frequency signals. The radio frequency data can include (e.g., encode) signals from one or more satellite vehicles 110. In some embodiments, the receiver electronics 310 can amplify and/or filter the radio frequency signals. In some embodiments, the receiver electronics 310 can down covert the radio frequency signals, which can allow for more efficient processing by the processing circuit 305. In some embodiments, the receiver electronics 310 can receive and process incoming radio frequency signals including satellite signals on multiple frequencies or bands (e.g., L1 signal and L2 signal).

The processing circuit 305 further includes a calibration signal generator 315, an interference suppressor 320, and one or more tracking channels 325. The calibration signal generator 315 is configured to generate and output calibration signals. The calibration signals can be used to test the GNSS calculations executed by the processing circuit 305, such as to generate reference parameters which can be used to determine the effect of various processing operations performed by the processing circuit 305, including operation of the interference suppressor 320.

The calibration signals generated by the calibration signal generator 315 can be similar to satellite vehicle signals. For example, the calibration signals can have similar spectral properties as and be generated using similar modulation schemes as those used to generate the satellite signals, such as satellite signals used by the processing circuit 305 (e.g., by tracking channels 325) to track satellite vehicles 110 and determine pseudoranges. In some embodiments, the calibration signals are spectrally similar to GNSS signals. For example, the magnitude of the calibration signals at various frequencies in the frequency domain may be similar to that of GNSS signals. The calibration signal may have a similar code chipping rate as GNSS signals (e.g., to a specific GNSS signal). The calibration signal can be generated using a calibration code.

In some embodiments, the calibration signal generator 315 receives an identifier of the satellite vehicle 110 for which a satellite signal is included in the incoming radio frequency signal, and generates the calibration signal based on the identifier, so that the calibration signal is specific to the identified satellite vehicle 110. This may improve operation of the processing circuit 305 in implementations where the interference suppression error is specific or unique to the satellite signal of the identified satellite vehicle 110.

In some embodiments, the calibration signal generator 315 configures the calibration signal to have a sufficient signal strength for accurate measurement. For example, the signal strength may be greater than a first threshold corresponding to a desired signal to noise ratio for the calibration signal. The signal strength may also be less than a second higher threshold at which the calibration signal may degrade operation of the tracking channels 325 (e.g., may degrade correlation to the satellite signal of the incoming radio frequency signal).

The calibration signal generator 315 can provide a calibration signal 332 (e.g., an analog radio frequency signal) to the receiver electronics 310. The receiver electronics 310 can apply (e.g., combine with, inject into) the calibration signal 332 to the incoming signals (e.g., incoming signals including radio frequency satellite signals from the satellite vehicle 110) to generate a calibrated incoming signal 336 (e.g., for output to interference suppressor 320). The application of the calibration signal 332 to the incoming signals can be performed by the receiver electronics 310 at various stages in the signal processing performed by the receiver electronics 310, including applying the calibration signal 332 to the incoming signals before or after down conversion (e.g., when the receiver electronics 310 down converts the signals being processed to an intermediate frequency, such as an intermediate frequency of approximately 1 MHz), as well as before or after an analog-to-digital conversion which may be performed prior to reception of the calibrated incoming signal 336 by the interference suppressor 320.

As will be described further herein, the calibrated incoming signal 336, which will undergo various signal processing operations including interference suppression by the interference suppressor 320, can be used to represent the effect (e.g., time delay) of the signal processing executed by the processing circuit 305; calibrating to this effect may then allow the effect to be compensated for. The calibration signal generator 315 can also provide a calibration code 334 (e.g., a PRN code corresponding to the calibration signal) used by the tracking channels 325 to perform a calibrated tracking in both the presence and the absence of signal processing operations such as interference suppression.

The interference suppressor 320 receives signals output by the receiver electronics 310. The interference suppressor 320 can receive the calibrated incoming signal 336 (e.g., having the calibration signal 332 now imparted to the incoming signal which also contains the real satellite signals from the satellite vehicle 110) from the receiver electronics 310. In some embodiments, the receiver device 300 includes one or more analog to digital converters (e.g., in processing circuit 305) which convert analog signals received from the receiver electronics 310 into digital data to be processed by the interference suppressor 320. As noted above, the calibration signal 332 may be applied to the incoming signals before or after processing by the one or more analog to digital converters.

The interference suppressor 320 performs interference suppression (e.g., anti-jamming) on the signals received from the receiver electronics 310. For example, the interference suppressor 320 can execute an interference suppression algorithm on the signals received from receiver electronics 310, such as calibrated incoming signal 336. The interference suppression algorithm may include instructions for modifying the radio frequency signals. The interference suppressor 320 can apply signal processing filters to the signal to be processed, such as to increase or decrease the amplitude or phase of the signal to be processed at certain frequencies/frequency bands. In some embodiments, the interference suppressor 320 may execute the interference suppression algorithm by performing a mathematical combination of delayed versions of the signal to be processed. The interference suppressor 320 may execute the interference suppression algorithm based on an expected behavior of the interference being applied to the satellite signals. It will be appreciated that it is unlikely that the interference suppressor 320 will output a processed signal corresponding to the signal transmitted by the satellite vehicle as if no radio frequency interference were present; therefore, the interference suppressor 320 may introduce additional error into the signal processing pathway of the receiver device 300 (even if the interference suppressor 320 removes all effects of the radio frequency interference). In some embodiments, the interference suppressor 320 executes interference suppression on the calibrated incoming signal 336. Executing interference suppression on the calibrated incoming signal 336 can result in output of one or both of a suppressed incoming signal (e.g., based on interference suppression of the incoming signal received by the receiver electronics 310 from the radio frequency antenna 308 and imparted with the calibration signal 332) and a suppressed calibrated incoming signal (e.g., based on interference suppression of the calibrated radio frequency signal 336 itself). The interference suppressor 320 can generate suppressed signals (e.g., generate a suppressed calibrated incoming signal from the calibrated incoming signal; generate a suppressed incoming signal from the incoming signal). As shown in FIG. 3, the interference suppressor 320 outputs a suppressed signal 338 (e.g., suppressed calibrated incoming signal and/or suppressed incoming signal) to the tracking channels 325. In some embodiments, the interference suppressor 320 executes at least one of frequency excision, time domain filtering, amplitude domain processing, wavelet domain excision, or space-time adaptive processing to suppress at least one of matched spectrum jammers, multiple narrow band jammers, partial band jammers, or swept jammers.

As shown by the dashed lines, the effect of the interference suppressor 320 may be tested under conditions in which it is known that no radio frequency interference is present in the incoming radio frequency signals received by the radio frequency antenna 308. For example, the interference suppressor 320 can receive a calibrated incoming signal 340 which includes the incoming signals (e.g., including a satellite signal) and has had the calibration signal 332 applied to the incoming signals. Because it is known that no radio frequency interference is present in the incoming radio frequency signals received by the radio frequency antenna 308 and thus in the calibrated incoming signal 340, when the interference suppressor 320 executes interference suppression on the calibrated incoming signal 340, a suppressed calibrated incoming signal 342 is outputted which will only be different from the calibrated incoming signal 340 because of the interference suppression. As such, in some embodiments, time delay from executing tracking channels 325 using the suppressed calibrated incoming signal 342 as compared to executing tracking channels 325 using the calibrated incoming signal 340 (and/or using the calibration code 334) will correspond to the effect of the interference suppression. This can provide an indication of the processing delay which may be introduced by operation of the interference suppressor 320, allowing for this delay to be predetermined for use during later operation when radio frequency interference may be present in the incoming signals received by the radio frequency antenna 308 (e.g., as described below with reference to the predetermined pseudorange calibration parameter).

The interference suppressor 320 can execute interference suppression algorithms such as time domain filtering, amplitude domain processing, wavelet domain excision, and/or space-time adaptive processing. The interference suppressor 320 may execute various other interference suppression/anti-jamming algorithms; it will be appreciated that the inventive concepts disclosed herein may be used to compensate for errors introduced by any of a variety of interference suppression algorithms, even if the computational steps of the interference suppression algorithm are not known. As such, the interference suppressor 320 can counteract one or more of matched spectrum jammers, multiple narrow band jammers, partial band jammers, or swept jammers.

The one or more tracking channels 325 can determine range parameters corresponding to each satellite vehicle (e.g., based on satellite signals received from corresponding satellite vehicles). The range parameter may be representative of a distance from the receiver device 300 to the satellite vehicle from which the satellite signal is received. The range parameter may be a pseudorange parameter for the satellite vehicle. The range parameter may include at least one of a code position parameter (corresponding to correlating a local PRN code to information encoded in the satellite signal) or a carrier phase parameter (corresponding to tracking the satellite vehicle based on a carrier frequency of the satellite signal). Where the receiver device 300 includes a plurality of tracking channels 325, different tracking channels 325 may be used to track satellite signals from different satellite vehicles and/or the calibration signal from the calibration signal generator 315; tracking channels 325 may be executed in parallel to decrease overall computation speeds. The same tracking channel 325 may be executed in multiple instances for each time a correlation is executed (e.g., a first tracking channel may be a first instance, a second tracking channel may be a second instance). In some embodiments, a first tracking channel 325 may be used to generate the suppressed calibrated pseudorange parameter, and a second tracking channel 325 used to generate the satellite pseudorange parameter, where the second tracking channel 325 may be a reconfigured implementation of the first tracking channel 325 or a different tracking channel 325 (similarly for additional tracking channels 325 used to generate additional pseudorange parameters).

The tracking channel 325 can retrieve a local code (e.g., local PRN code), and compare the local code to the signal received from the interference suppressor 320 (e.g., the suppressed incoming signal or the suppressed calibrated incoming signal) to determine the pseudorange parameter. For example, the tracking channel 325 can execute a correlation of the local code and the received signal, identify a time shift which when applied to the local code aligns the local code and the received signal (e.g., maximizes the correlation), and calculate the pseudorange parameter using the time shift and the speed of light. The processing circuit 305 (e.g., using tracking channel 325) can execute various corrections to the determination of the pseudorange parameter based on known parameters (e.g., based on atmospheric properties, based on differential GNSS techniques, based on other GNSS calculation methods).

The tracking channel 325 can generate a satellite pseudorange parameter using the suppressed incoming signal, representing pseudorange when interference suppression is executed on the incoming signal received from the satellite vehicle. The tracking channel 325 can also generate a suppressed calibrated pseudorange parameter using the suppressed calibrated incoming signal, representing a reference pseudorange corresponding to the calibration signal in the presence of both radio frequency interference and interference suppression.

The processing circuit 305 can compare the suppressed calibrated pseudorange parameter to a predetermined calibrated pseudorange parameter to determine an interference suppression error. In some embodiments, the predetermined calibrated pseudorange parameter is calculated by receiving the calibration signal at the tracking channel 325, and comparing the calibration signal to the calibration code (e.g., correlating the calibration signal to the calibration code). As such, the predetermined calibrated pseudorange parameter may represent a reference pseudorange corresponding to the calibration signal in the absence of radio frequency interference and interference suppression (e.g., as discussed with respect to signals 340, 342).

By comparing the suppressed calibrated pseudorange parameter to the predetermined calibrated pseudorange parameter, the processing circuit 305 can calibrate for the effect (e.g., ranging error, time delay) of radio frequency interference and interference suppression on the overall signal processing pathway from the receiver electronics 310 to the output of the tracking channels 325. The processing circuit 305 can thus modify the satellite pseudorange parameter using the interference suppression error to compensate for the interference suppression error. For example, the processing circuit 305 can add or subtract the interference suppression error to the time shift calculated by the tracking channels 325 when correlating the local signal to the incoming signal. The interference suppression error can be frequency dependent. For example, GPS L1 error is likely to be different than GPS L2 error. The interference suppression error can also vary depending on the type of GNSS signal being tracked).

Referring now to FIGS. 4A-4D, schematic diagrams of various signal processing operations are shown according to the inventive concepts disclosed herein. The signal processing operations may be performed by various devices and systems described herein (e.g., platforms or other devices of communication network 100, the system 200, the receiver device 300), such as for executing code delay discrimination. The signal processing operations described with reference to FIGS. 4A-4D can be executed for both code position calculations and carrier phase calculations.

Figure 4A:
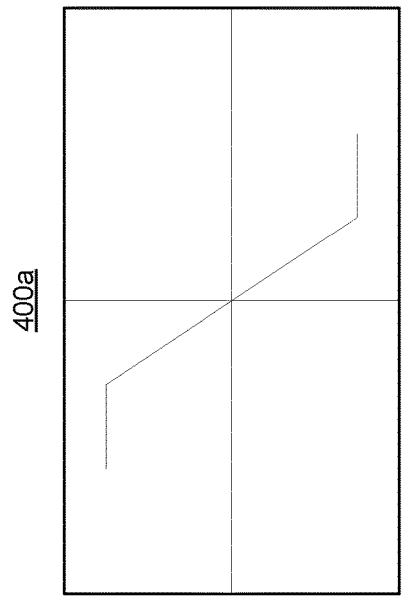
FIGS. 4A-4D are schematic diagrams of exemplary embodiments of signals processed according to the inventive concepts disclosed herein.

FIG. 4A illustrates a signal 400a, such as a code delay discriminator signal, generated by executing a correlation of a calibrated incoming signal (e.g., by applying a calibration signal to an incoming signal, in the absence of RF interference) to the calibration code (e.g., based on a time shift calculated to maximize the correlation of the calibrated incoming signal to the calibration code).

Figure 4B:
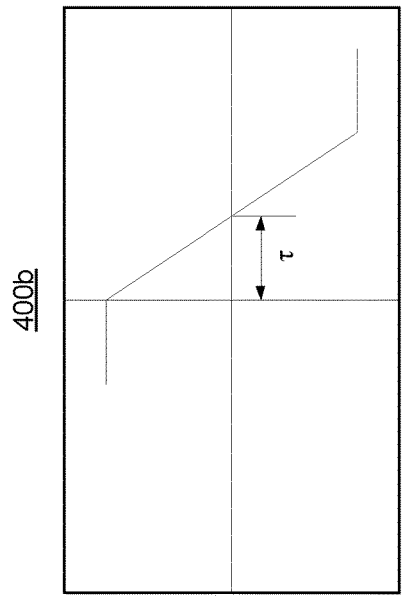

FIG. 4B illustrates a signal 400b generated by executing a correlation of a suppressed calibrated incoming signal (e.g., by applying a calibration signal to an incoming signal, and executing interference suppression) to the calibration code (e.g., using tracking channel 325), yield a ranging error that shifts the signal 400b. As shown in FIG. 4B, the signal 400b has an offset $\tau$ relative to the signal 400a. The offset $\tau$ can represent an error resulting from signal processing operations performed outside of the tracking channel, including error from interference suppression. The offset $\tau$ can be calculated by comparing (e.g., subtracting) the time shift calculated for signal 400b to time shift calculated for the signal 400a.

Figure 4C:
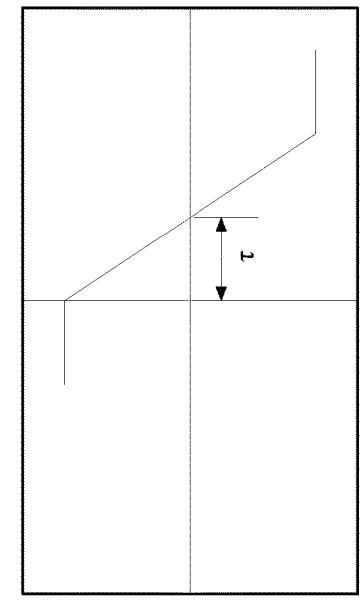
Figure 4D:
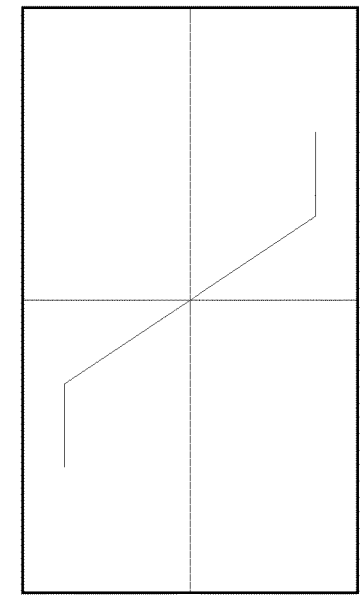

FIG. 4C illustrates a signal 400c generated by executing a correlation of a suppressed incoming signal (e.g., executing interference suppression on an incoming signal from a satellite vehicle). Because the interference suppression introduces error into the signal processing pathway, the signal 400c has an offset $\tau$ (it will be appreciated that when the correlation is performed, the offset $\tau$ will not be apparent based only on the correlation of the signal 400c). As the offset $\tau$ has been determined by comparing the time shifts calculated for the signals 400a and 400b, the interference suppression error can be corrected by appropriately shifting the signal 400c by the offset $\tau$, resulting in the corrected signal 400d illustrated in FIG. 4D. While FIGS. 4A-4D provides illustrative shapes for signals 400a-400d, any of a variety of signals may be corrected for signal processing errors in a manner consistent with the inventive concepts disclosed herein.

Figure 5:
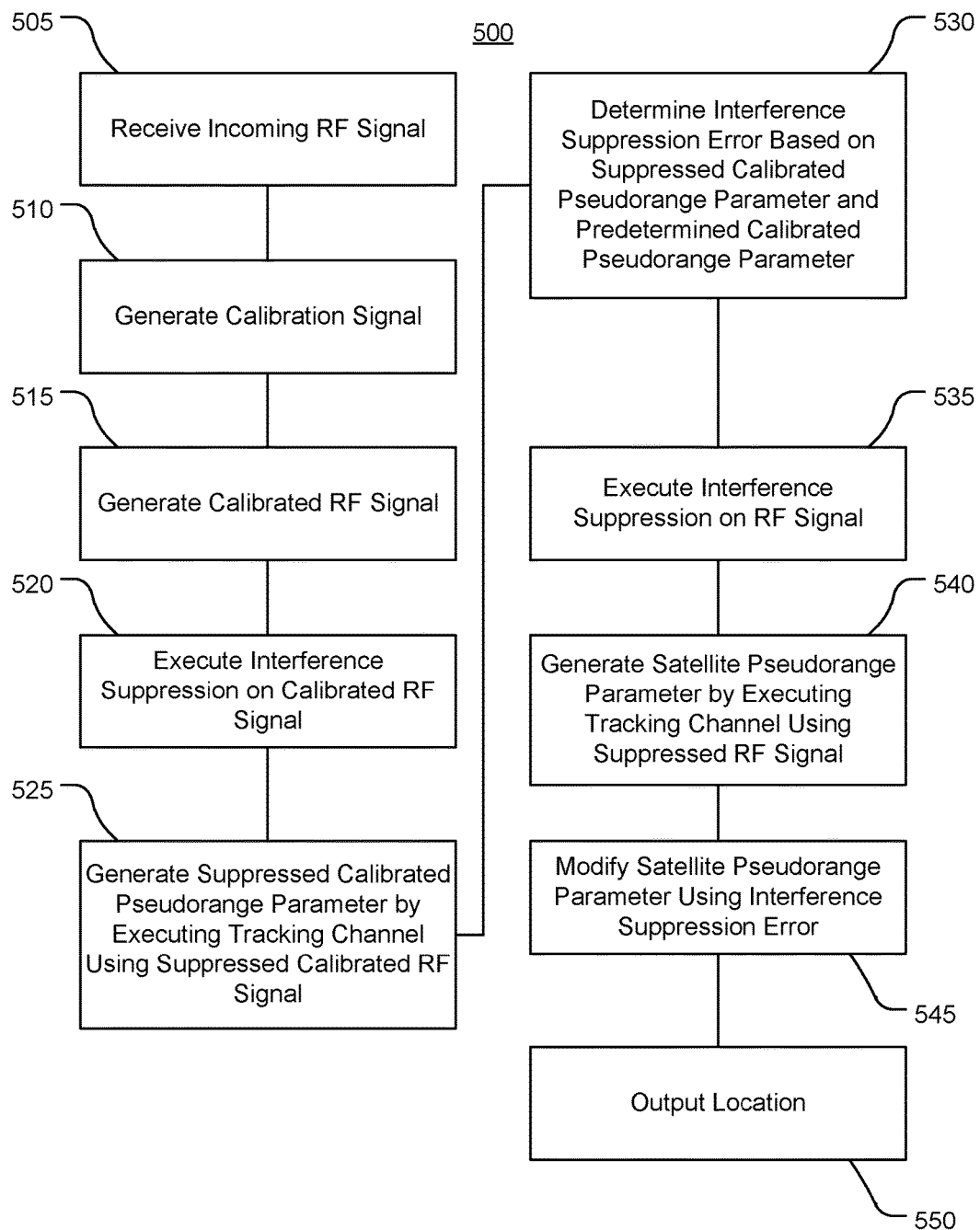
FIG. 5 is a diagram of an exemplary embodiment of a method for GNSS processing during interference suppression according to the inventive concepts disclosed herein.

Referring now to FIG. 5, an exemplary embodiment of a method 500 according to the inventive concepts disclosed herein may include the following steps. The method 500 may be executed using various hardware, apparatuses, and systems disclosed herein, such as one or more of the platforms or portable electronic device of the communication network 100, the system 200, the receiver devices 300, the operations described with reference to signals 400a, 400b, 400c, and 400d, and/or components or features thereof.

A step (505) may include receiving an incoming signal. The incoming radio frequency signal includes a radio frequency satellite signal (e.g., GNSS signal, GPS signal) from a satellite vehicle. The incoming signal may be subjected to radio frequency interference. The satellite signal may encode a PRN code. The satellite signal may be received by a radio frequency receiver (e.g., radio frequency antenna). A plurality of satellite signals may be received from a plurality of satellite vehicles and form portions of the incoming radio frequency signal.

A step (510) may include generating a calibration signal. The calibration signal may be similar to satellite signals. For example, the calibration signal may be of a similar code chipping rate to the signals encoded on satellite signals. The calibration signal may be spectrally similar to GNSS signals. The calibration signal may have a signal strength configured for accurate measurement. For example, the signal strength may be greater than a first threshold corresponding to a desired signal to noise ratio for the calibration signal. The signal strength may also be less than a second higher threshold at which the calibration signal may degrade with the ability of a GNSS receiver to correlation with satellite signals (e.g., degrade the correlation to an extent that the GNSS receiver can no longer execute tracking).

A step (515) may include generating a calibrated incoming signal. The calibrated incoming signal may be generated by applying (e.g., modulating using, injecting into, combining with) the calibration signal to the incoming signal. Generating the calibrated satellite signal may include combining the calibration signal and the incoming signal as analog signals in receiver electronics which receive the incoming signal. In some embodiments, applying the calibration signal to the incoming signal includes applying the calibration signal to the incoming signal before or after down conversion of the incoming signal to an intermediate frequency. In some embodiments, applying the calibration signal to the incoming signal includes applying the incoming signal before or after conversion of the incoming signal from an analog signal to a digital signal.

A step (520) may include executing an interference suppression algorithm on the calibrated incoming signal, such as to execute anti-jamming. Executing the interference suppression algorithm generates a suppressed calibrated incoming signal. Executing the interference suppression algorithm may include executing at least one of a frequency excision algorithm, time domain filtering, amplitude domain processing, wavelet domain excision, or space-time adaptive processing, such as to suppress at least one of matched spectrum jammers, multiple narrow band jammers, partial band jammers, or swept jammers.

A step (525) may include generated a suppressed calibrated pseudorange parameter based on the suppressed calibrated incoming signal. Generating the suppressed calibrated pseudorange parameter may include executing a tracking channel using the suppressed calibrated radio frequency signal. The tracking channel may correlate the suppressed calibrated satellite signal to the calibration code to generate the suppressed calibrated pseudorange parameter (e.g., based on a time shift which when applied to the suppressed calibrated satellite signal may maximize the correlation). The suppressed calibrated pseudorange parameter may include at least one of a code position parameter or a carrier phase parameter.

A step (530) may include determining an interference suppression error based on the suppressed calibrated pseudorange parameter and a predetermined calibrated pseudorange parameter. Determining the interference suppression error may include comparing (e.g., subtracting) the suppressed calibrated pseudorange parameter to the predetermined calibrated pseudorange parameter. The predetermined calibrated pseudorange parameter may be calculating by executing a tracking channel on the calibration signal (e.g., correlating the calibration signal to the calibration code), either in real time or in a controlled environment (e.g., during manufacturing or testing). The predetermined calibrated pseudorange parameter may be calculated on a periodic basis (e.g., at startup of a GNSS receiver device) rather than during each GNSS location calculation, which may reduce the computational resources needed to execute each GNSS location calculation. In some embodiments, specific interference suppression errors are determined which specifically correspond to at least one of the code position parameter or the carrier phase parameter, and may be used to respectively correct the corresponding at least one of the code position parameter or the carrier phase parameter.

A step (535) may include executing the interference suppression algorithm on the incoming signal. For example, frequency excision or other interference suppression algorithms may be executed on the incoming signal to generate the suppressed incoming signal. In some embodiments, executing the interference suppression algorithm on the incoming signal may be implicitly performed when executing the interference algorithm on the calibrated incoming signal as described above, as the incoming signal forms a portion of the calibrated incoming signal. For example, executing the interference suppression algorithm on the calibrated radio frequency signal may include interference suppression of the calibrated incoming signal and of the incoming signal, resulting in both the suppressed calibrated incoming signal and the suppressed incoming signal. As such, executing the interference suppression algorithm on the incoming signal and executing the interference suppression algorithm on the calibrated incoming signal may be performed as a single action or as distinct actions.

A step (540) may include generating a satellite pseudorange parameter. The satellite pseudorange parameter may be generated by executing a tracking channel using the suppressed incoming signal, such as to perform a correlation, determine a time shift based on the correlation (e.g., to align the suppressed incoming signal to a local signal, such as by maximizing the correlation), and calculate the satellite pseudorange parameter based on the time shift.

A step (545) may include modifying the satellite pseudorange parameter using the interference suppression error. For example, the interference suppression error can be added or subtracted to the time shift corresponding to the satellite pseudorange parameter, so that a modified satellite pseudorange parameter can be generated which is corrected for interference suppression error.

A step (550) may include outputting a location based on the modified satellite pseudorange parameter. The location may be determined based on modified satellite pseudorange parameters corresponding multiple (e.g., three, four) satellite vehicles.

In some embodiments, the method 500 includes using the location to execute navigation and/or targeting functions. For example, the location may be displayed; navigation instructions may be updated based on the location; a flight plan may be updated based on the location; targeting instructions may be updated based on the location.

As will be appreciated from the above, systems and methods for GNSS processing during interference suppression according to embodiments of the inventive concepts disclosed herein may improve operation of aircraft, other platforms, GNSS receiver electronics, and portable electronics devices by correcting errors introduced by interference suppression systems, even in real time while radio frequency interference is being received and interference suppression is being performed to counteract the radio frequency interference. As such, the inventive concepts disclosed herein can improve GNSS signal processing technology, leading to more accurate/reliable position determination, navigation, and targeting operations.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A receiver device, comprising:
   a radio frequency receiver configured to receive an incoming signal, the incoming signal including a radio frequency (RF) satellite signal from a satellite vehicle; and
   a processing circuit configured to:
   generate a calibration signal;
   apply the calibration signal to the incoming signal to generate a calibrated incoming signal;
   execute an interference suppression algorithm on the calibrated incoming signal to generate a suppressed calibrated incoming signal;
   execute a first tracking channel using the suppressed calibrated incoming signal to generate a suppressed calibrated pseudorange parameter;
   compare the suppressed calibrated pseudorange parameter to a predetermined calibrated pseudorange parameter to determine an interference suppression error;
   execute the interference suppression algorithm on the incoming signal to generate a suppressed incoming signal;
   execute a second tracking channel corresponding to the satellite vehicle using the suppressed incoming signal to generate a satellite pseudorange parameter;
   modify the satellite pseudorange parameter using the interference suppression error; and
   output a location of the receiver device based on the modified satellite pseudorange parameter.

2. The receiver device of claim 1, wherein each pseudorange parameter includes at least one of a code position parameter or a carrier phase parameter.

3. The receiver device of claim 1, wherein the processing circuit is configured to determine the predetermined calibrated pseudorange parameter by executing a third tracking channel by correlating the calibrated incoming signal with a calibration code corresponding to the calibration signal.

4. The receiver device of claim 1, wherein the processing circuit is configured to execute the interference suppression algorithm to counteract jamming of the satellite signal.

5. The receiver device of claim 4, wherein the processing circuit is configured to execute the interference suppression algorithm using at least one of a frequency excision algorithm, time domain filtering, amplitude domain processing, wavelet domain excision, or space-time adaptive processing to suppress at least one of matched spectrum jammers, multiple narrow band jammers, partial band jammers, or swept jammers.

6. The receiver device of claim 1, wherein the pseudorange parameter includes a code position parameter, and executing the second tracking channel includes correlating the suppressed incoming signal with a local pseudo random noise code corresponding to the satellite vehicle.

7. The receiver device of claim 1, wherein modifying the satellite pseudorange parameter using the interference suppression error reduces an error of the satellite pseudorange parameter.

8. The receiver device of claim 1, wherein the calibration signal has a signal strength greater than a first threshold corresponding to a desired signal to noise ratio for the calibration signal and less than a second threshold associated with interference in correlating the satellite signal of the incoming signal with a local signal.

9. The receiver device of claim 1, wherein the calibration signal is spectrally similar to a global navigation and satellite system (GNSS) signal corresponding to the satellite vehicle.

10. The receiver device of claim 1, wherein the satellite vehicle is at least one of a global positioning system (GPS) vehicle or a global navigation satellite system (GNSS) vehicle.

11. A method, comprising:
    receiving an incoming signal, the incoming signal including a radio frequency (RF) satellite signal from a satellite vehicle;
    generating a calibration signal;
    applying the calibration signal to the incoming signal to generate a calibrated incoming signal;
    executing an interference suppression algorithm on the calibrated incoming signal to generate a suppressed calibrated incoming signal;
    executing a first tracking channel using the suppressed calibrated incoming signal to generate a suppressed calibrated pseudorange parameter;
    comparing the suppressed calibrated pseudorange parameter to a predetermined calibrated pseudorange parameter to determine an interference suppression error;

executing the interference suppression algorithm on the incoming signal to generate a suppressed incoming signal;

executing a second tracking channel corresponding to the satellite vehicle using the suppressed incoming signal to generate a satellite pseudorange parameter;

modifying the satellite pseudorange parameter using the interference suppression error; and outputting a location of a receiver device based on the modified satellite pseudorange parameter.

12. The method of claim 11, wherein each pseudorange parameter includes at least one of a code position parameter or a carrier phase parameter.

13. The method of claim 11, further comprising determining the predetermined calibrated pseudorange parameter by executing a third tracking channel using a calibration code corresponding to the calibration signal and the calibrated incoming signal.

14. The method of claim 11, wherein executing the interference suppression algorithm includes executing at least one of a frequency excision algorithm, time domain filtering, amplitude domain processing, wavelet domain excision, or space-time adaptive processing to suppress at least one of matched spectrum jammers, multiple narrow band jammers, partial band jammers, or swept jammers.

15. The method of claim 11, wherein the pseudorange parameter includes a code position parameter, and executing the second tracking channel includes correlating the suppressed incoming signal with a local pseudo random noise signal corresponding to the satellite vehicle.

16. The method of claim 11, wherein the calibration signal has a signal strength greater than a first threshold corresponding to a desired signal to noise ratio for the calibration signal and less than a second threshold associated with interference in correlating the satellite signal of the incoming signal with a local signal, the second threshold greater than the first threshold.

17. An airborne platform, comprising:
a satellite receiver associated with an antenna configured to receive an incoming signal, the incoming signal including a radio frequency (RF) satellite signal from a satellite vehicle, the satellite receiver including a processing circuit configured to:

generate a calibration signal;

apply the calibration signal to the incoming signal to generate a calibrated incoming signal;

execute an interference suppression algorithm on the calibrated incoming signal to generate a suppressed calibrated incoming signal;

execute a first tracking channel using the suppressed calibrated incoming signal to generate a suppressed calibrated pseudorange parameter;

compare the suppressed calibrated pseudorange parameter to a predetermined calibrated pseudorange parameter to determine an interference suppression error;

execute the interference suppression algorithm on the incoming signal to generate a suppressed incoming signal;

execute a second tracking channel corresponding to the satellite vehicle using the suppressed incoming to generate a satellite pseudorange parameter;

modify the satellite pseudorange parameter using the interference suppression error; and output a location of the satellite receiver based on the modified satellite pseudorange parameter.

18. The airborne platform of claim 17, further comprising a navigation system configured to receive the location of the satellite receiver and at least one of (1) display the location or (2) update navigation instructions based on the location.

19. The airborne platform of claim 17, wherein the satellite vehicle is at least one of a global positioning system (GPS) vehicle or a global navigation satellite system (GNSS) vehicle.

20. The airborne platform of claim 17, further comprising a targeting system configured to generate targeting instructions for movement of an object, wherein the targeting system updates the targeting instructions based on the location.

* * * * *